3,117,835
METHOD OF TRANSPORTING AMMONIUM
NITRATE
Robert A. Shurter, Jr. and Jerome L. Martin, Terre Haute, Ind., assignors to Commercial Solvents Corporation, New York, N.Y., a corporation of Maryland
No Drawing. Filed July 11, 1960, Ser. No. 41,749
2 Claims. (Cl. 23—103)

Our invention relates to a method for the transportation of ammonium nitrate. More particularly, it relates to a less hazardous and more convenient method for the transportation of substantially anhydrous ammonium nitrate in a liquid, readily flowable state at ordinary temperatures and pressures.

In the past, the transportation and storage of ammonium nitrate have presented numerous problems and many methods have been investigated with a view of attempting to overcome the various difficulties with which the industry has previously been faced. None of these, however, has been completely successful.

Until comparatively recent years, ammonium nitrate has been produced by reacting ammonia with aqueous nitric acid and evaporating to dryness the ammonium nitrate thus formed, followed by graining or prilling or other suitable treatment so as to leave the ammonium nitrate in condition suitable for handling and use. Efforts have been made to store, transport and use the ammonium nitrate in the aqueous condition in which it is formed, or after some degree of concentration, or in the form of aqueous ammonium nitrate-ammonia solution. None of these efforts, however, has been completely satisfactory or successful for a number of reasons. Some solutions, for example, have been highly corrosive even toward stainless steel vessels, and difficulty has been experienced in finding suitable anti-corrosion agents, with the result that expensive containers have been required for the storage and transportation of the ammonium nitrate in solution form. Further disadvantages lie in the fact that the relatively large quantities of water present increase very materially the costs of transporting the ammonium nitrate in solution form. Still other disadvantages reside in the relatively high vapor pressure, high crystallization temperatures, the sensitivity of the material to shock and consequent transportation and governmental regulations affecting the storage and transportation of ammonium nitrate.

Ammonium nitrate has generally, in the past, been converted into solid particles or prills, the production of which has increased materially the cost of preparing the ammonium nitrate for storage and transportation. And even in the form of solid particles or prills, the ammonium nitrate is subject to numerous disadvantages from the point of view of both storage and transportation. Being highly hygroscopic in nature, it is necessary to store the particles or prills of ammonium nitrate promptly after formation in a manner so as to prevent access of even relatively small amounts of moisture from the atmosphere or elsewhere. In addition to such a method of storage, it is necessary to coat the particles or prills promptly after formation with suitable coating materials in order to minimize caking. The selection of suitable coating materials without at the same time materially affecting the sensitivity of the ammonium nitrate to shock, or its subsequent use for whatever purpose the ammonium nitrate is to be employed, is both difficult and at the same time materially increases the cost of the final ammonium nitrate product.

Even in the form of satisfactorily coated particles or prills, the storage and transportation of ammonium nitrate presents a number of problems. For example, as the temperature of the stored material passes the temperature 92° F., changes in crystalline structure take place which cause the particle or prill forms to spall. Also, in particle or prilled form, a given weight of ammonium nitrate occupies considerably larger volume, resulting in increased transportation costs. In solid form, also, the ammonium nitrate is subject to transportation and government regulations which restrict its shipment by water, normally the cheapest method of transportation.

It has also been suggested that ammonium nitrate can be stored and transported in the form of a substantially anhydrous ammoniacal ammonium nitrate solution. Such solutions have been found to satisfactorily overcome the aforementioned difficulties which have faced the industry in the past. Nevertheless, the salting out point of previously utilized ammoniacal ammonium nitrate solutions containing ammonium nitrate in economically desirable amounts, at least 3 parts of ammonium nitrate by weight for every part of ammonia by weight, is not even as low as 32° F. Naturally, when the amount of ammonium nitrate in the solution is lowered, the salting out temperature is also lowered; however, this results in a raising of the vapor pressure often to a point where expensive pressurized packages must be utilized. Because of the need for storing ammonium nitrate over long periods of time, and under varying field conditions, substantially anhydrous ammonium nitrate solutions which precipitate ammonium nitrate even as low as 32° F. are of little or no value throughout all but a small part of the continental United States.

We have now discovered a method of storing and transporting substantially anhydrous ammonium nitrate in the form of a substantially anhydrous ammoniacal ammonium nitrate solution the solution containing even as high as 100 parts by weight of ammonium nitrate for every 25 parts by weight of ammonia which eliminates precipitation of solid ammonium nitrate at temperatures far below the freezing point of water while still possessing all of the other benefits gained from the utilization of substantially anhydrous ammoniacal ammonium nitrate solutions.

We have discovered that the storage and transportation of substantially anhydrous ammonium nitrate can be readily and economically effected by utilizing a product prepared by adding to substantially anhydrous gaseous but preferably liquid ammonia substantially anhydrous ammonium nitrate in the molten form or as the I, II, II, and IV crystalline form i.e., crystalline forms which exist at or above approximately −0.6° F. the final product containing about 100 parts of ammonium nitrate and from about 25 to about 100 parts by weight of ammonia, the addition step being carried out under controlled conditions of temperature and pressure. The referred to temperature is preferably maintained approximately 5° F. above the temperature at which the substantially anhydrous nitrogen salts out. We prefer to operate at a pressure approximately at or above the vapor pressure of the substantially anhydrous nitrogen solution at the operating temperature. The temperature may be regulated either by exchange cooling (refrigeration or water) or by the controlled evaporation of part of the ammonia from the substantially anhydrous nitrogen solution. Other ammonia-soluble materials such as urea, sodium nitrate, etc., can also be incorporated into the compositions utilized in our process if desired.

We can prepare ammonium nitrate for transportation and storage by our new method in various ways; and hence, it is understood that the specific procedure described herein are solely for the purpose of illustration and that our process is not limited to the specific conditions outlined herein.

A convenient method of preparing ammonium nitrate for storage or transportation by our new method consists of first placing the required amount of substantially anhydrous solid ammonium nitrate in the molten form or in either crystalline I, II, III, or IV forms in a mixing tank which is a closed vessel and preferably provided with means for mixing the contents thereof either by an agitator or by means of a pump to circulate the liquid contents of the mixing tank or both. It is desirable also to provide the mixing tank with means for regulating the pressure therein and means for heat removal either internal or external. The amount of substantially anhydrous ammonia required to give the desired ratio of ammonia and ammonium nitrate in the product is then added to the ammonium nitrate in the mixing tank. The contents are mixed either by means of an agitator or by means of a circulating pump referred to above, the contents of the tank being maintained preferably at any desired temperature above the salting out point consistent with the pressure desired. In lieu of the refrigeration means discussed above, the desired temperature and pressure can be maintained in the mixing tank during the mixture operation by permitting the regulated escape of ammonia vapor therefrom through a suitable pressure control valve or vent.

An alternate method of preparing ammonium nitrate for transportation or storage by our new method consists of first placing in a closed or open mixing tank a previously prepared solution of substantially anhydrous nitrogen prepared from substantially anhydrous liquid ammonia and substantially anhydrous ammonium nitrate in the molten form or in either crystalline I, II, III, or IV forms and simultaneously continuously adding to said solution substantially anhydrous ammonia and substantially anhydrous solid ammonium nitrate in the molten form or in either crystalline I, II, III, or IV forms in the proportions necessary to give a nitrogen solution of the desired composition. The solution to which the ammonia and the ammonium nitrate is added is maintained in a stage of agitation usually by means of a mechanical agitator or by means of a circulating pump or both and the temperature and pressure are regulated as described above in the case where a closed vessel is used. If an open vessel is used, temperature is maintained above the salting out point and at or below the boiling point of the solution. Obviously all compositions utilized in our invention can not be made by the open tank method. Substantially anhydrous nitrogen solutions of the desired composition is continuously withdrawn from the mixing tank or circulating line and transferred to a storage tank or to tank cars or to tanks on river barges.

In any of the procedures described above, the ammonia is perferably introduced into the mixing tank from a sparger located near the bottom of the tank or into the circulating line ahead of the cooler. The molten form or either the crystalline I, II, III, or IV forms of ammonium nitrate are preferably introduced into the mixing tank near the top of the tank.

The ammonia content of substantially anhydrous nitrogen solutions as made by any particular method is determined by whether or not the operation can be carried out under elevated pressures. If, for example, the solution of the ammonium nitrate in the liquid ammonia is effected at atmospheric pressure in either equipment open to the air or connected to ammonia recovery equipment the minimum concentration of ammonia that can be employed is 19.5% and the maximum possible temperature is approximately 79° F. A tank operating at this temperature will flash cool of its own accord to maintain a constant temperature and hence, will require ammonia recovery for efficient and economic operation. In general, the rate of solution under such conditions will be slow with the result that a considerable amount of solids in the slurry form will be present at all times with the result that filtration will be necessary for recovery of a clear substantially anhydrous solution.

The substantially anhydrous liquid ammonium nitrate thus prepared is less sensitive to shock than either solid ammmonium nitrate or aqueous solutions of ammonium nitrate and ammonia sold in commerce as nitrogen solutions. One cubic foot of the liquid contains substantially more nitrogen than a cubic foot of either solid ammonium nitrate or aqueous nitrogen solution. It also is less corrosive to iron storage and shipping containers in either solid ammonium nitrate or commercially aqueous nitrogen solutions.

The following table contains data showing the salting out temperature and vapor pressures of representative solutions utilized in our process.

| Pounds of $NH_4NO_3$ per pound of $NH_3$ | Salting out Temperature, ° F. | Vapor pressures, 60° F., p.s.i.g. |
|---|---|---|
| 3.00 | 5 | 1 |
| 2.75 | −9 | 2 |

Now having described our invention, what we claim is:

1. In a method of transporting and storing substantially anhydrous ammonium nitrate, the improvement which comprises converting ammonium nitrate into a liquid readily flowable at ordinary temperatures and pressures by incorporating with substantially anhydrous ammonium nitrate in a form selected from the group consisting of molten, crystalline I, crystalline II, crystalline III and crystalline IV, substantially anhydrous ammonia in proportions to give substantially anhydrous compositions consisting essentially of ammonium nitrate 100 parts by weight and ammonia 25 to 100 parts by weight.

2. A method of reducing the hazard in transporting and storing ammonium nitrate which comprises converting ammonium nitrate into a liquid readily flowable at ordinary temperatures and pressures by dissolving substantially anhydrous ammonium nitrate in a form selected from the group consisting of molten, crystalline I, crystalline II, crystalline III and crystalline IV in substantially anhydrous ammonia in amounts such as to give a final composition consisting essentially of 100 parts ammonium nitrate to 25 to 100 parts by weight of ammonia and flowing the resulting liquid composition into storage and transportation vessels.

References Cited in the file of this patent
UNITED STATES PATENTS 2,077,469     Frazel _____ Apr. 20, 1937
2,657,977     Stengel _____ Nov. 3, 1953